June 11, 1935.                C. A. BECKER                2,004,745
                        BALANCE OR WEIGHING SCALE
                            Filed June 5, 1934

INVENTOR
Christopher A. Becker,
BY
Fraser, Myers & Manley
ATTORNEYS.

Patented June 11, 1935

2,004,745

UNITED STATES PATENT OFFICE 2,004,745

BALANCE OR WEIGHING SCALE

Christopher A. Becker, Nutley, N. J., assignor to The Torsion Balance Company, New York, N. Y., a corporation of New York Application June 5, 1934, Serial No. 729,100

4 Claims. (Cl. 265—60)

My present invention relates to weighing scales or balances of the type employing a weighing chain, one end of which is hung from the scale beam and the other end from a movable carrier whereby more or less of the chain may be adjusted to bear upon the beam as may be required for any weighing operation.

The objects of my invention, among others, are to provide in a balance of the type described (1) a greater clearance space for access to the balance pans; (2) to eliminate any errors which might arise due to different lateral displacements of the beam component of the chain longitudinally of the beam and the crowding of the chain links at the bight of the chain when different effective lengths of chain are used; (3) to facilitate the weighing operation by avoiding the necessity of the eye of the operator following an index member up and down along a vertical column; (4) to reduce parallax to a minimum; and (5) to generally improve the construction and arrangement of parts whereby to insure a maximum of accuracy and speed in the use of the balance.

The foregoing and other objects of my invention not herein specifically enumerated I accomplish by providing a novel construction and arrangement of carrier means for the dead end of the chain whereby the depending portions of the chain will lie in a plane at a right-angle to the plane of the scale beam and the points of suspension of the chain will lie in a common horizontal plane so that the effective and ineffective suspended components of the chain will be equal for any particular effective weight of chain, and whereby, through the use of a graduated dial and an arcuate vernier index disposed in front of the beam, and reading of the weight of the active component of the chain can be more quickly and accurately made. The invention will be better understood from the detailed description which follows, when considered in conjunction with the accompanying drawing, showing a preferred embodiment of my invention, and wherein, Figure 1 is a front elevation of a laboratory or analytical balance embodying my invention.

Figure 1:
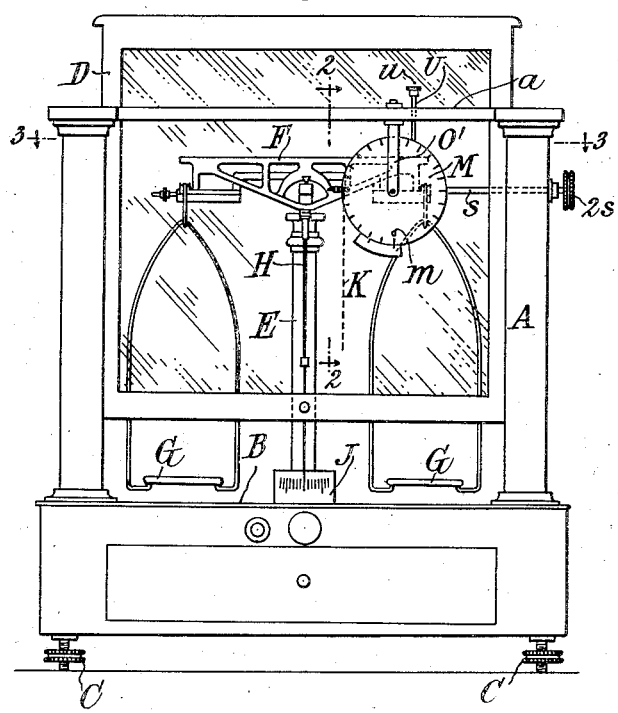
Figure 2:
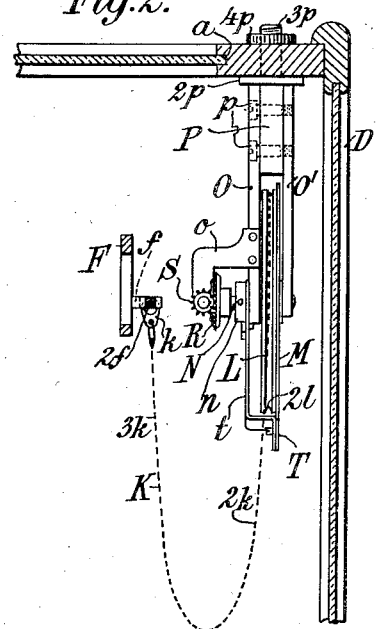
Fig. 2 is an enlarged section taken substantially along the plane of the line 2—2 of Fig. 1.

Referring to the drawing, wherein I have shown the invention as embodied in a labortory or analytical balance, let A indicate a balance case having a base B, conventional leveling screws C and a sliding front panel D. Within the case is a conventional column E mounted upon the base and supporting upon a central knife edge a balance beam F, from the ends of which are suspended scale pans G. The balance beam dependingly carries a needle or pointer H which is adapted to swing in front of a graduated index J.

Figure 6:
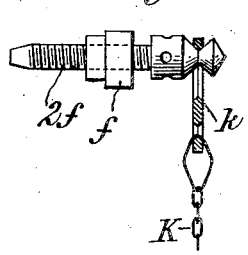
Fig. 6 is an enlarged sectional elevation of a detail of the invention.
Figure 3:
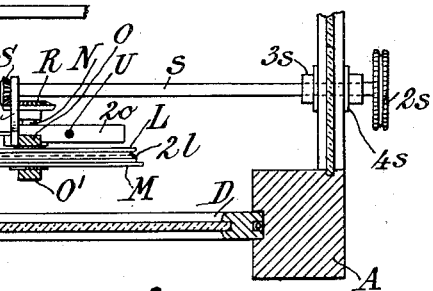
Fig. 3 is an enlarged section taken substantially along the plane of the line 3—3 of Fig. 1.
Figures 4, 5:
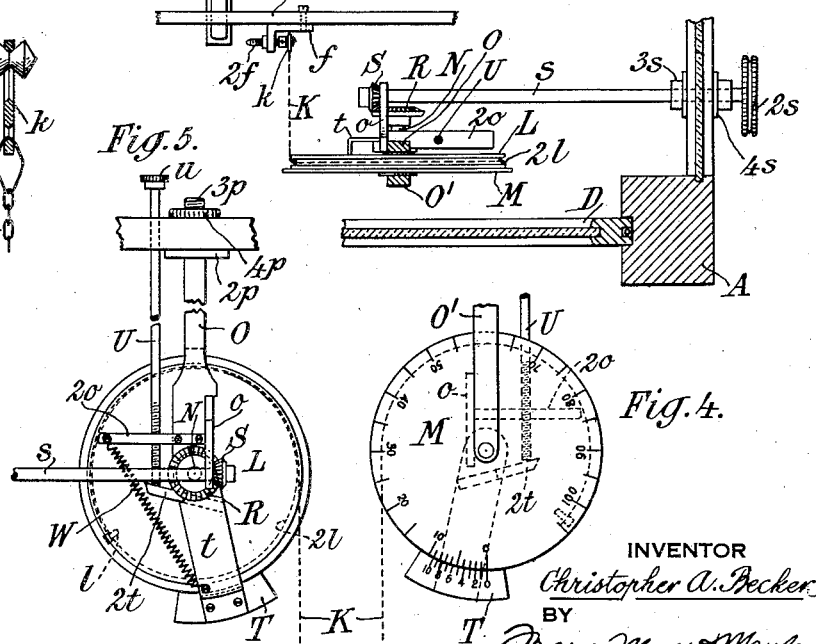
Fig. 4 is an enlarged front elevation of the dial and vernier elements.
Fig. 5 is a rear elevation showing the supporting and operative means for the dial and vernier.

Carried by the balance beam is a bracket $f$, through one arm of which is adjustably threaded a screw $2f$, the head of which is formed with an annular V-shaped groove adapted to receive the end suspending link $k$ of the weighing chain K. In practice the end link $k$ is formed at its inner periphery with a knife edge so as to accurately position the chain in the V-shaped groove of the screw-head $2f$, as best shown in in Fig. 6. The opposite end of the chain K is fastened by a screw or pin $l$ within a peripheral groove $2l$ in a drum or pulley sheave L, upon the front face of which is carried a graduated dial M.

The drum L is fixedly carried upon a spindle N supported in bearings provided in the lower ends of a pair of depending arms O and O' which are secured to a post P through screws $p$, said post having a flange $2p$ engaging against the underside of the top frame $a$ of the balance case and being supported by said top frame through the medium of a screw-threaded shank $3p$ which passes through said case and a locking nut $4p$.

Preferably the axis of the spindle N lies in a common horizontal plane with the axis of the screw $2f$, and the diameter of the drum L is such that the depending portion $2k$ of the chain suspended therefrom will lie in a common plane with the depending portion $3k$ of the chain suspended from the beam, which common plane is at substantially a right-angle to the plane of the balance beam. As the axis of the drum L coincides with the axis of the spindle N, it will be apparent that the point of tangency of the chain component $2k$ with the drum will also lie in substantially the horizontal plane of the axis of the spindle N. It will thus be seen that under all weighing conditions the suspended components 2k and 3k of the chain K will always be of equal length and lie in a plane at right-angles to the balance beam. All errors which might arise from any displacement of the chain longitudinally of the beam and from any crowding of the chain links at the bight of the chain due to unequal suspended chain components are thus eliminated. In other words, the points of suspension for the chain which determine the catenary curve which the chain will assume for any effective length of chain, lie in a common horizontal plane.

For paying out or varying the length of the suspended chain components, any suitable means may be provided for rotating the drum L. As herein shown, this is accomplished through a bevel gear R mounted at one end of the spindle N, and a bevel gear S mounted upon a shaft s which extends through the side wall of the balance case and terminates in an enlarged thumb-wheel 2s. The bevel gear S is held in meshing engagement with the gear R by the guiding or limiting stop flanges 3s and 4s mounted on the shaft S, or any other suitable means. A suitable secondary bearing support for said shaft s is provided by a bracket member o carried by the depending arm O. To guard against rotating the drum beyond its capacity to pay out or take up the chain, the dial M is provided with a stop pin m adapted to engage the arm O'.

For facilitating and promoting the accuracy of reading the dial M, which may be calibrated in milligrams or other suitable values, I have provided an arcuate vernier index T disposed in cooperative peripheral relation to the dial, said vernier index being carried by an arm t which is mounted for rotation about a common axis with the spindle N between the arm O and a ring n adjustable on the spindle N. The arm t carries a lateral offset portion 2t providing an abutment against which the end of a screw U is adapted to bear, the said screw being threaded through a fixed arm 2o extending laterally from the arm O. The outer end of the screw U extends through the top frame a of the case and is provided with a thumb-wheel u for facilitating rotation thereof. To insure movement of the vernier T as the screw U is moved in either direction, and to hold said vernier in any adjusted position, there is provided a spring W, one end of which is connected to the outer end of the arm 2o and the other end of which is connected to the arm t so as to exert a tension for holding the offset portion 2t in engagement with the inner end of the screw U.

From the foregoing detailed description it will be apparent that as the hand wheel 2s is turned, the chain K will either be wound upon or paid off from the drum L to vary the length of the active component 3k of the chain. During this action the vernier T will remain stationary and it may then be used to read the dial or may be independently adjusted to set the zero for the basis of a weighing operation. By mounting the dial and vernier in front of the beam in close proximity to the front panel of the balance case and by eliminating the vertical chain supports from the base, the weighing operations can be greatly facilitated.

While I have shown and described a preferred embodiment of my invention, it is to be understood that I do not wish to be limited to the details of construction disclosed except in so far as they may be limited by the spirit of the invention as claimed.

What I claim is:

1. A scale or balance comprising a scale beam, a movable chain carrier, and a weighing chain suspended at one end from the beam and at its other end from the movable carrier, the points of suspension of the chain, which determine the catenary curve which the chain will assume for any particular effective length of chain, lying in a common, substantially horizontal plane.

2. A scale or balance comprising a scale beam, a weighing chain suspended at one end from the beam in proximity to the central support of the beam, a rotatable drum to which the other end of the chain is connected for varying the effective weighing component of the chain, said drum being mounted on an axis disposed at a right angle to the plane of the beam and in a common horizontal plane with the chain support on the beam, a graduated dial rotatable with said drum, an adjustable arcuate vernier for cooperation with the periphery of the dial disposed in substantially the same plane as the dial, means for moving the dial and the vernier independently of each other, and spring means for holding the vernier in any set position.

3. A scale or balance comprising a balance case, a scale beam, a weighing chain suspended at one end from the beam, a rotatable drum to which the other end of the chain is connected for varying the effective weighing component of the chain, said drum being mounted on an axis disposed at a right angle to the plane of the scale beam and in a common plane with the chain support on the beam, a graduated dial rotatable with said drum disposed between the scale beam and the front of the balance case, and an adjustable index for cooperation with said dial.

4. A scale or balance comprising a balance case, a scale beam, a weighing chain suspended at one end from the beam, a rotatable drum to which the other end of the chain is connected for varying the effective weighing component of the chain, a spindle for said drum supported by the balance case above the base thereof, the axis of the spindle and the chain support on the scale beam lying in the same horizontal plane, a graduated dial rotatable with said drum and an index for cooperation with said dial.

CHRISTOPHER A. BECKER.